United States Patent [19]

Mengel et al.

[11] Patent Number: 5,031,224
[45] Date of Patent: Jul. 9, 1991

[54] FLEXIBLE RECOGNITION OF SUBJECT STRUCTURES IN COLOR AND PICTURE HALF-TONE IMAGES

[75] Inventors: Peter Mengel, Eichenau; Siegfried Kilgenstein; Stefan Esterhammer, both of Munich, all of Fed. Rep. of Germany

[73] Assignee: Siemens Aktiengesellschaft, Munich, Fed. Rep. of Germany

[21] Appl. No.: 217,847

[22] Filed: Jul. 8, 1988

[30] Foreign Application Priority Data

Jul. 10, 1987 [DE] Fed. Rep. of Germany ....... 3722922

[51] Int. Cl.⁵ .............................................. G06K 9/00
[52] U.S. Cl. ....................................... 382/10; 382/48; 382/41
[58] Field of Search ..................... 382/10, 11, 41, 48, 382/44, 13, 45, 24, 59, 448, 449

[56] References Cited

U.S. PATENT DOCUMENTS

| | | | |
|---|---|---|---|
| 4,490,847 | 12/1984 | Meksonder et al. | 382/10 |
| 4,497,066 | 1/1985 | Gasparri, Jr. | 382/48 |
| 4,555,801 | 11/1985 | Miyagawa et al. | 382/44 |
| 4,685,142 | 8/1987 | Ooi et al. | 382/13 |
| 4,847,772 | 7/1989 | Michalopoulos et al. | 382/10 |

FOREIGN PATENT DOCUMENTS 57-45678 3/1982 Japan ................................... 382/10
WO86/03866 7/1986 PCT Int'l Appl. .

OTHER PUBLICATIONS

"Shape Recognition System by Variable Size Slit Method", proceedings from 1986 IEEE, Oct. 1986, pp. 424-426.
"Heute Bereits Fest Etabliert", Markt & Technik, Nr. 6, Feb. 7, 1986, pp. 82-104.

Primary Examiner—Michael Razavi
Attorney, Agent, or Firm—Hill, Van Santen, Steadman & Simpson

[57] ABSTRACT

Apparatus for the flexible recognition of subject structures in color and picture half-tone images incorporates a recognition system that can recognize general subject structures in a video image given arbitrary orientation. The signal of an opto-electronic image converter is supplied via an analog-to-digital converter to a digital hardware image pre-processor in which the momentary brightness value of the image scanning is processed with a preceeding logic result with the assistance of control information, and the new result is again stored. The reduced image data read out from the result memory at the end of an image pass can be interpreted in a job-specific way in an image processor.

7 Claims, 4 Drawing Sheets

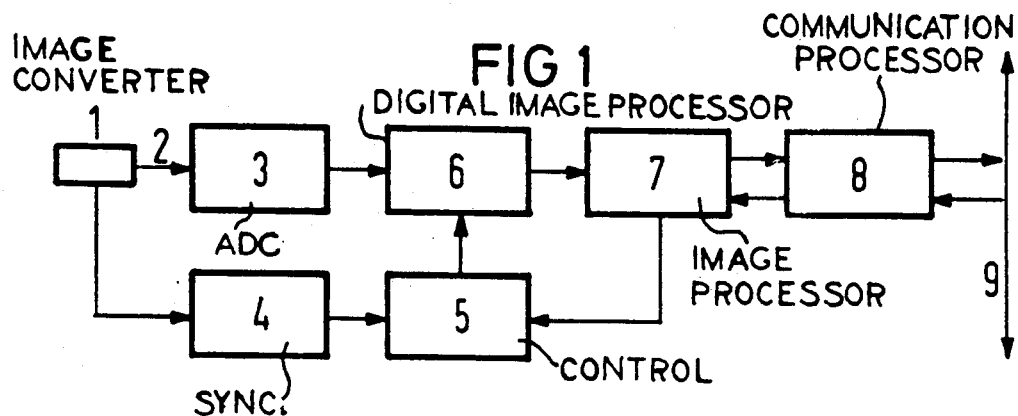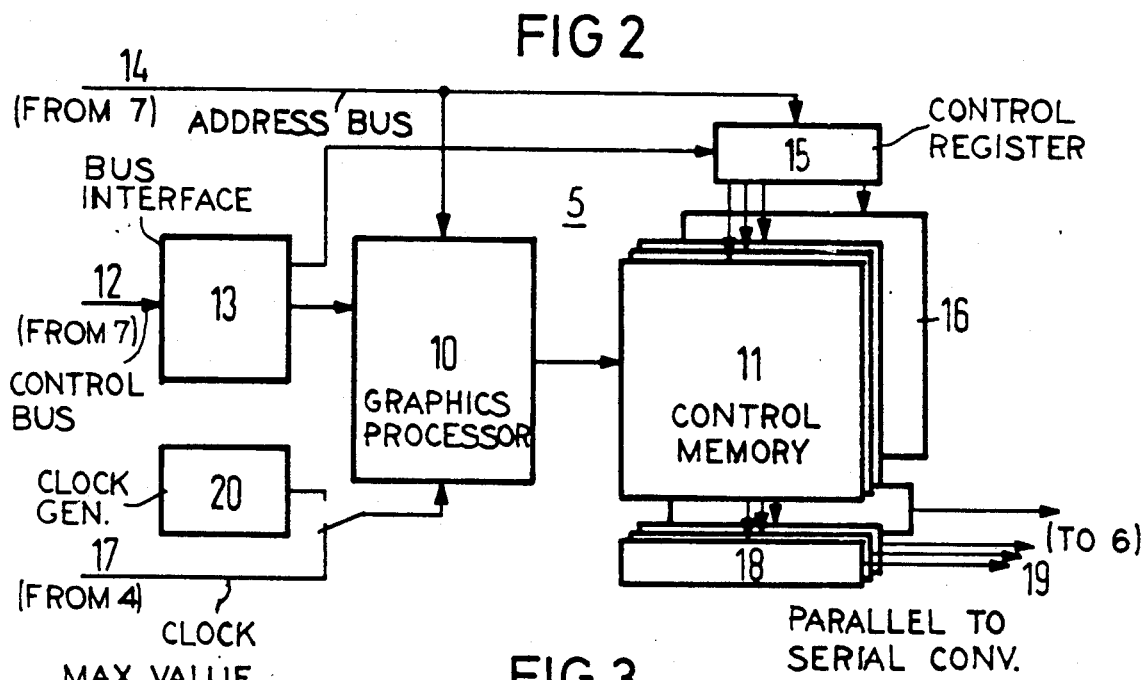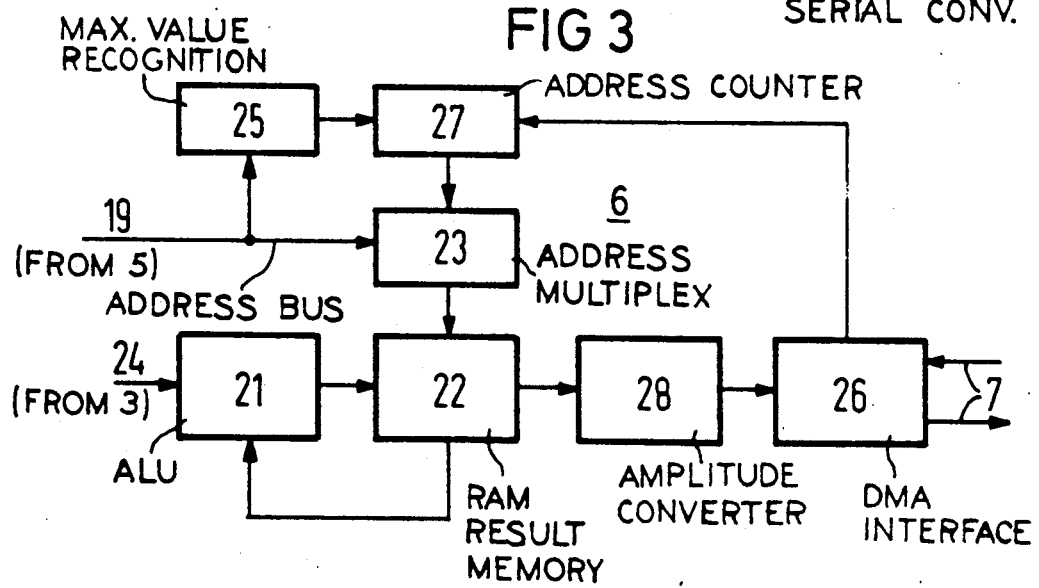

FLEXIBLE RECOGNITION OF SUBJECT STRUCTURES IN COLOR AND PICTURE HALF-TONE IMAGES

BACKGROUND OF THE INVENTION

The invention is directed to an apparatus for flexible recognition of subject structures comprising an opto-electronic image converter for line-by-line image scanning, whereby the respectively momentary brightness value of selected parts of the image scanning is logically processed with a defined, previously derived logic result deposited in a memory and the reduced image data are interpreted in an image processor for locating the sought structures.

The automation of visual measuring and testing processes in industrial production requires sensor systems having high flexibility and short processing times. The image processing must keep pace with the speed of modern production lines given different recognition jobs. Clock times of a few 1/10 seconds are thereby provided.

Image processing systems that enable the processing of a stored video image in the gray-key image (8 bits) with computer programs are currently available as commercially available systems.

The immense data sets (about 1OM byte/sec) arising in the image interpretation, however, cannot be conveniently processed and interpreted by any computer system on-line, even with the employment of special hardware processors, such as bit slice systems or array processors. As a consequence of the high capital costs and of the involved program development, the employment of such systems in industrial fabrication, moreover, is only seldom economical.

It is therefore necessary to implement a data reduction of the on-line image information, based on job-specific subject features on the basis of a designational hardware processing.

An electronically scanned color image having a topical resolution of 512×512 points and 3×8 bits for the R, G and B channels supplies a data stream of 157 million bps for a scanning rate of 25 frames per sec. (Markt Und Technik, No. 6, 7 February 1986, pgs. 82-104).

European Patent Application 196,514 discloses an apparatus for the detection of edges that recognizes the orthogonal edge structures of an image by summation of the digitized video signals of a CCD image converter in a row and column integrator.

SUMMARY OF THE INVENTION

The principal object of the invention is to design recognition apparatus in order to be able to recognize general subject structures in a video image with an arbitrary orientation. This object is achieved in accord with the apparatus described and claimed herein. Advantageous embodiments and improvements of the invention are also disclosed.

The electronic apparatus of the invention is essentially characterized by the following features:

Flexible, digital processing of the on-line sequentially arising video signals (color or gray tone pixels of an image converter (preferably using a CCD semiconductor camera) corresponding to the block diagram shown in FIG. 1.

Control of the logic operations of arbitrary picture elements by the informational content of a RAM memory (controlled memory), which is read out in parallel to form the video signal.

Job-specific, fast programming of the control memory within the blanking interval of the video signal by a universal graphics processor.

Logic operation of the individual picture elements in a digital processing stage (for example an ALU with possible arithmetic image operations, such as summation and formation of differences, and/or Boolean algebra) and deposit of the result of the selected image operations in a RAM result memory. A data reduction from, typically 526 k bytes per full video frame to 2048 bytes of job-relevant image features is thereby achieved.

Application-specific further-processing of the reduced image data in a suitable microprocessor system (for example, microprocessor IC type 80188).

Portrayal of the prescribed processing course on a T.V. monitor for simple, flexible programming of the control unit.

The significant advantage of the invention consists in that stored control information is present for fast processing of color and picture half-tone images, this control information enabling the job-specific logic operation of arbitrary picture elements in a digital interpretation unit and making the image content reduced in this fashion available for further image analysis.

SUMMARY OF THE DRAWINGS

The invention shall be set forth with reference to the Figures, in which:

FIG. 1 is a greatly simplified functional block diagram of a means for flexible, digital picture half-tone image processing;

FIG. 2 is the control unit for flexible image processing;

FIG. 3 is a functional block diagram of the digital pre-processing of the video picture;

PREFERRED EMBODIMENT

Figure 4:
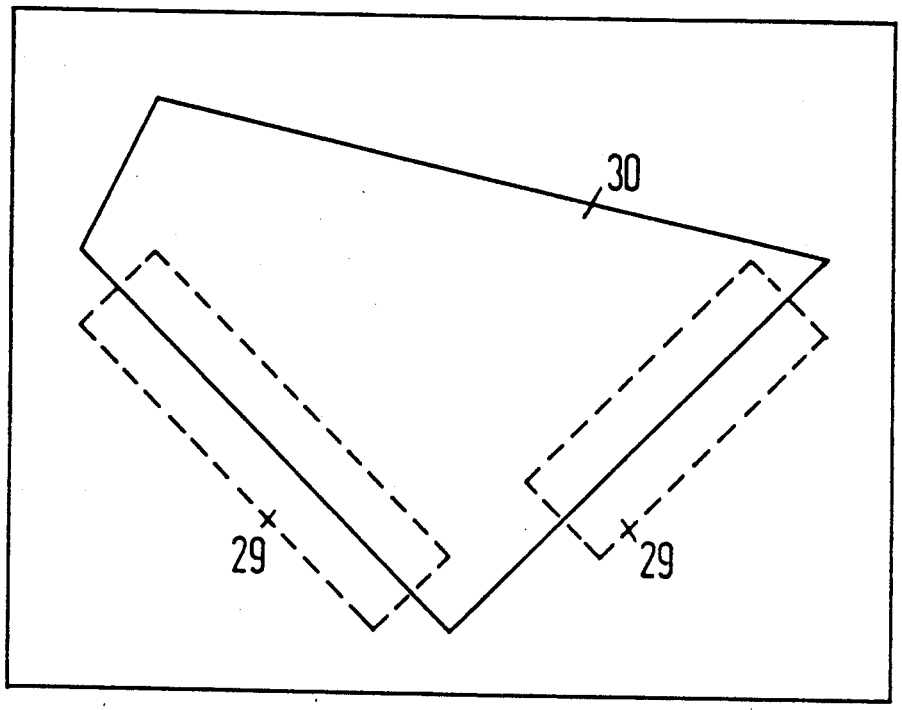
FIG. 4 is an applied example illustrating detecting a subject having arbitrarily oriented edges.

In FIG. 1, an image converter 1 (preferably a CCD semiconductor camera or the like) converts the image reproduced on an image matrix into individual, electrical charge packets that are then serially read out line-by-line very fast in the form of a video signal 2 (serial picture elements, for example gray tone pixels) using conventional charge transfer techniques. Scanning takes place over the entire frame, on a line-by-line basis, with a horizontal blanking interval at the end of each scan line and a vertical blanking interval after scanning each frame. The analog video signal 2 is digitized in an analog-to-digital converter 3. In addition to the horizontal and vertical video synchronization pulses H, V, $V_R$, the pixel clock signal which is required for further execution is also acquired simultaneously in a synchronization unit 4. This unit comprises a phase locked loop (PLL) circuit composed of a phase detector, a voltage-controlled oscillator, and a digital frequency divider in the feedback branch. The unit 4 supplies its signals to a control unit 5, that provides a control address for the digital image processor 6, contemporaneously with every digital pixel-representing signal from the analog-to-digital converter 3.

The control unit 5 is further described with reference to FIG. 2, and the digital image processor 6 is further described with reference to FIG. 3. The image information pre-processed in the arithmetic unit of the digital image processor is conducted, for further interpretation, to an image processor 7, which comprises, for example, a microprocessor IC type 80188. The results of the image processor 7 acquired in this way are introduced into a local computer network 9 via a communication processor 8, for example IC type 8031. Via this network, the results of the image processing from one or more analogously constructed interpretation units can be supplied to a higher-ranking system computer that is not shown in FIG. 1.

FIG. 2 shows a more detailed illustration of the control unit 5 from FIG. 1. It includes a graphics processor 10, for example, an IC type PD 7220 available from NEC, whose vector generator executes a fast programming of a control memory 11. For example, the control memory is composed of 12 memory levels of 512×512 bits each realized with 64 k×4 bit RAM memory modules. Information for job-specific processing of the video image is written into this control memory 11 before the actual processing cycle. The operation of programming is initialized by the microprocessor 7 (FIG. 1) via an address bus 14 with additional control lines 12, connected to the graphics processor 10 through a BUS interface 13 (FIG. 2). The edge points of the memory information are transferred to the graphics processor 10 by means of the lines 12 and 14. A control register 15 selects, for example, the bit level 16 in the control memory 11 that is to be momentarily programmed or read out by the graphics processor. For the processing of the image information in the arithmetic unit of the digital imaging processor 6 (FIG. 1), clock signals are applied over the clock line 17 to the graphics processor 10 from the synchronization unit 4, to effect the read-out of the control memory 11 via a parallel-to-serial converter 18, thereby applying the control information to the control address lines 19 that are then supplied to the digital image processing 6, concurrently with the digital pixel data from the analog-to-digital converter 3. An internal clock generator 20 serves for testing purposes, when required.

The digital image processing unit 6 is composed of an arithmetic unit 21 (FIG. 3), for example an ALU IC type 74LS381 and a RAM result memory 22 in which the results of the image operation are deposited. This memory is realized as a 4 k×16 bit memory using IC type AM 9150 modules. The result memory 22 is addressed via the addresses identified on the lines 19 of the control unit 5. These lines lead into an address multiplexer 23 which addresses the individual cells of the RAM memory 22 for the arithmetic unit 21 such that, in accord with the desired processing, the respective cell content of the RAM memory is logically operated together with the signal from the ADC 3 corresponding to the momentary brightness value of the video image, in the arithmetic unit 21, and the result is in turn deposited in the same cell of the RAM result memory 22. The highest control address 19 occurring in a full video frame is recognized in a maximum value recognition unit 25 and is store in an address counter 27. After the processing, i.e. during the vertical blanking interval of the video signal, the address counter 27 is controlled by the DMA interface 26 to address the RAM memory 22, via the address multiplexer 23, and the RAM memory 22 supplies its data via a digital amplitude converter 28 to the DMA interface 26 for forwarding to the image processor 7 (FIG. 1).

When edge detection by means of summation of rows and columns is desired, the graphics processor 10, under control of the image processor 7, loads the control memory 11 with data which identifies a particular cell of the RAM 22 coincident with the arrival of a digital signal representative of the brightness value of a pixel at a particular x-y position within an entire frame. Only pixel data for pixels within predefined windows are processed, and for this data the output of the control memory 11 defines a storage location or cell in the RAM 22 which is designated to accumulate the sum of all pixel values in the same columns (or the same row). For each arriving data corresponding to a pixel in a given column, within a given window, the same address is presented to the RAM 22, with the result that all pixel values for that column in that window are accumulated at that storage location. For each different column (or row) in each window, a different RAM address is provided so that the RAM 22, at the conclusion of each frame, stores the summation of brightness values for each column (or row) in each window. This data is supplied to the image processor 7 during the next vertical blanking interval for analysis, resulting in recognition of the location and identification of the slope being sought in one or more windows. If recognition is not realized the content of the control memory 11 can be altered, for example to sum columns and/or rows in a rotated system of axes. The new series of addresses are stored in the control memory 11 as they are calculated by the fast graphics processor 10. The angular position of columns (for which summation is to be effected) can be shifted by supplying the same column-summation-result address to the RAM 22, via the control memory 11, slightly earlier (or later) during each successive scan line. The angular orientation of the rows (for summation of pixel values) can be altered by supplying a common row summation address to the RAM 22 earlier (or later) during successive scan lines. The pixel clock and the horizontal and vertical synchronizing signals derived from the synchronization unit 4 keep the outputs of the control memory 11 in synchronization with the incoming data from the ACD 3 corresponding to successive scan lines in successive frames.

In this example, since only the sum of the pixel values for rows and columns in selected windows are stored in the RAM 22, the data stored therein and forwarded to the image processor 7 during the vertical blanking interval represents a much reduced quantity, so that recognition or nonrecognition of the shape or edge being sought can take place very quickly.

The recognition system of the invention is suited for a versatile employment in the production field. The following examples illustrate the possibilities of the flexible real-time processing for resolving various objectives.

In many applications, the shape and position of objects is defined by the identification of the object edges. To this end, the recognition system can acquire the integral gray tone course of the image information within measuring windows having variable size and orientation, acquiring these on the basis of appropriate programming of the control memory. Thus, according to FIG. 4, a workpiece 30 to be recognized should be detected within two measuring windows 29 on the basis of the edges found therein, which yields a detection in terms of position and orientation. The electronic means executes this with the programming of the control memory 11 in the manner illustrated in FIG. 5.

Figure 5:
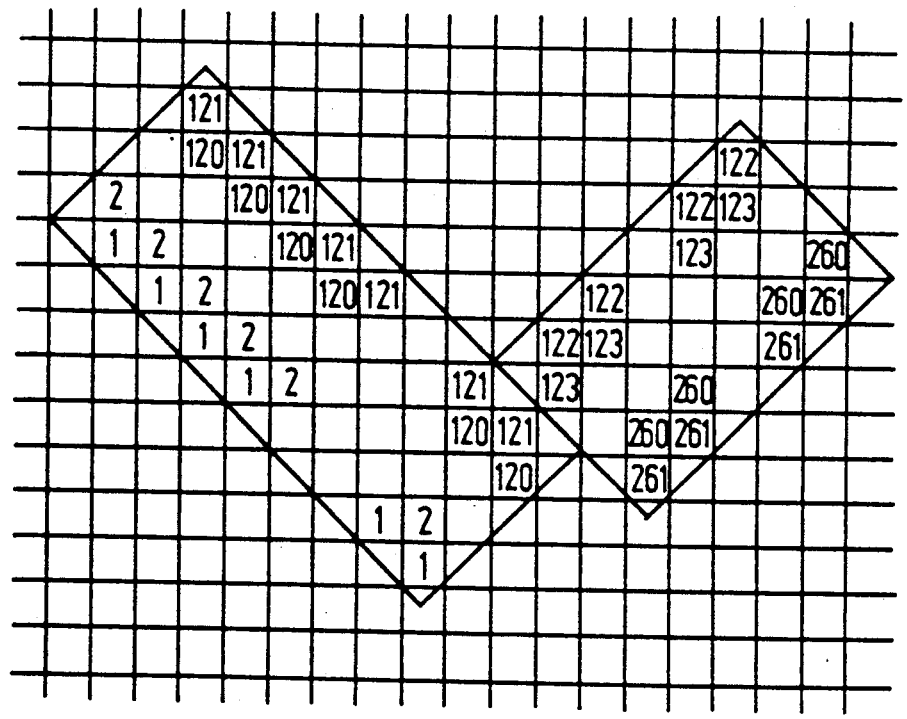
FIG. 5 illustrates the programming of the control memory for the applied example of FIG. 4.

As shown in FIG. 5, the sum of the pixel values in a line aligned with the lower left side of one window are to be stored in cell no. 1, the pixels in a parallel line next to the first line are to be stored in cell no. 2, etc. with the pixels aligned with the opposite side of the window stored in cell no. 121. Similarly, for the other windows, the sum of the pixel values in lines parallel to the upper left side of the window are stored in storage locations 122 through 261. These addresses are stored in the control memory 11 at locations which are read out, in synchronization with a scanning frame, so that the RAM 22 is addressed in the manner described above. Pixel data for other pixels (not within the window 29) is ignored as irrelevant to the recognition. At the end of the frame, the 261 cells of the RAM 22 are downloaded to the image processor 7 for analysis. It is apparent that the edges of the shape 30 within the windows 29 will be recognized from this data.

Figure 6:
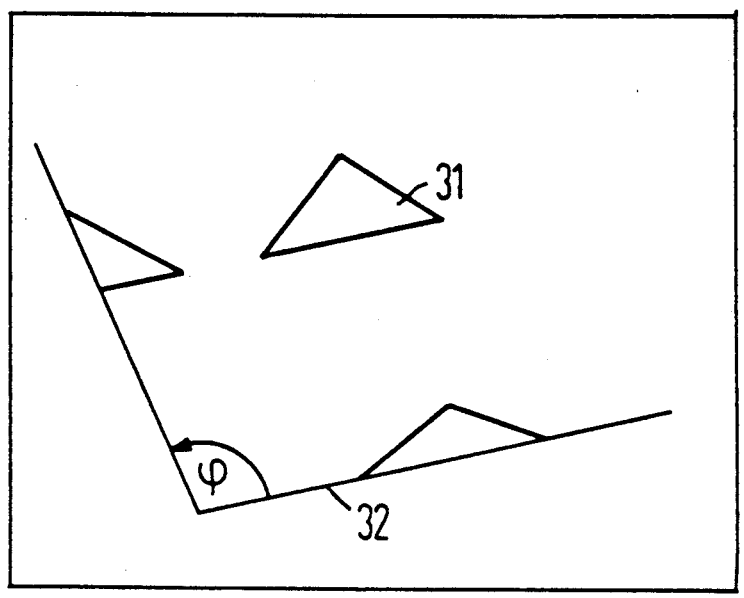
FIG. 6 is an applied example illustrating the gray tone projection histogram for arbitrarily oriented coordinate systems.

This method is especially well-suited for the detection of low-contrast edges in a disturbed environment (such as semiconductor structures, interconnects, text characters, etc.). The subject structures can have an arbitrary orientation relative to the lines of the video camera. In general, the projection of the digitized gray tones onto non-orthogonal coordinate systems can be executed with this method, as shown in FIG. 6. The subject recognition then ensues by correlation with the critical features of this two-dimensional projection histogram, as illustrated in FIG. 5.

Further, the recognition is not limited to linear structures. Arbitrarily complex object shapes are detected from the totality of their image after programming their envelope in the control memory.

FIG. 6 schematically shows the method for the formation of gray tone projection histograms at a subject 31 onto an arbitrarily oriented coordinate system 32. The precise position and orientation of the sought subject thereby derives from the maximum of the correlation value in the result memory after a dynamic search event. The detection of circles, for example apertures in printed circuit boards, represents a special case. A precise, lateral acquisition of the circular shape derives from radially arranged measuring windows that respectively identify the tangents at the circular shape.

Figure 7:
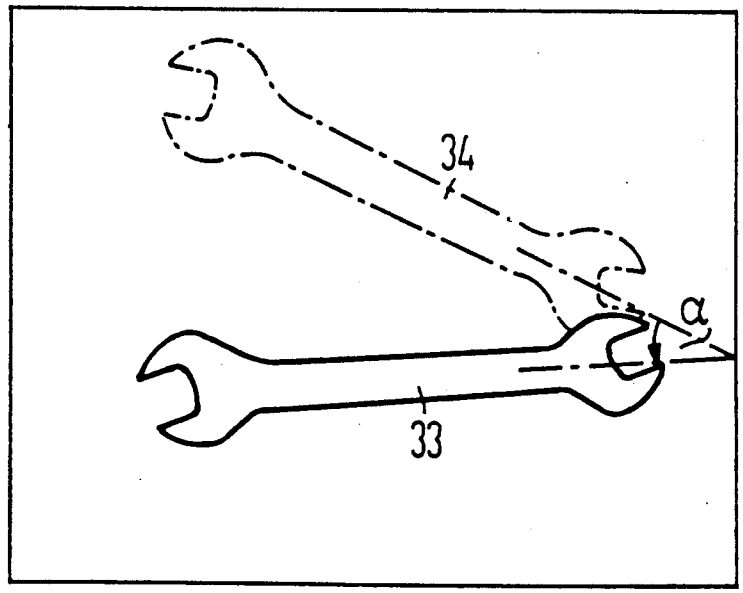
FIG. 7 is an example illustrating the recognition of arbitrary subject structures with electronic means.

FIG. 7 schematically illustrates the programming of the envelope 34 in the control memory for an arbitrarily shaped work-piece 33, this being capable of being used for fast detection of this workpiece in the image. This interpretation is implementable in real time.

Figure 8:
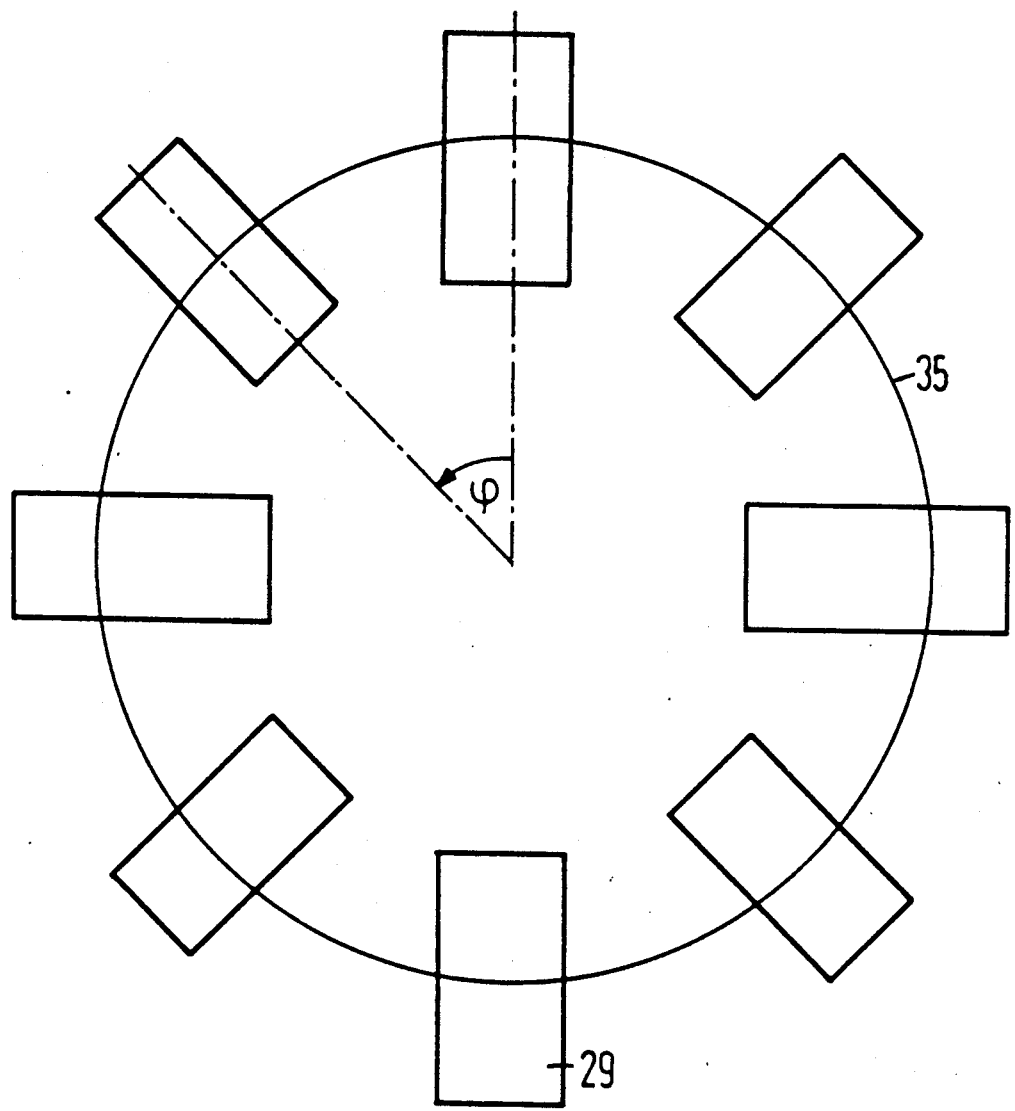
FIG. 8 is an example illustrating the method for positional identification of, for example, circular structures in a plurality of measuring windows processed in parallel.

FIG. 8 shows a method for the detection of a circular segment (for example, of a circle) 35 whose shape is radially found via the angle in a plurality of measuring windows 29 processed in parallel.

The method-wise function execution of the hardware is described below for an exemplary embodiment as an optical recognition system for the positioning of a printed circuit board in the automatic insertion or replacement of components.

Before the automatic insertion of printed circuit boards with components, the printed circuit board is conventially mechanically adjusted relative to the insertion tool of an automatic unit, via centering bores. High demands on the precision of the component mounting expected in the future shall make non-contacting adjustment with reference to the conductor pattern unavoidable. Arbitrary interconnect patterns must thereby be acquired by the recognition system for the adjustment event. These, for example, can be squares, crosses, circles, circular rings, lozenge structures, etc.

The printed circuit board is only roughly pre-positioned in the automatic insertion unit by the mechanical feed, so that the position-defining edges of the adjustment pattern, for example an irregular quadrilateral, such as the shape 30 shown in FIG. 4, appears in a prescribed set of windows (29, FIG. 4). When the adjustment structure has the pattern according to FIG. 4, then its position in the windows 29 can be determined by programming of the control memory 10 of the control unit 5 (FIG. 1) in the manner shown in FIG. 5, with the same cell value in the digital image processing unit (6, FIG. 1), being determined from the integral signal curve thereby obtained. This integral signal curve is interpreted software-wise with the image processor 7 (FIG. 1), for the recognition of the edge of the adjustment pattern such that the positions of the edges are identified by standard, known methods of digital image processing (for example, as described in Computer Vision, Dana H. Ballard and Christopher M. Brown, Prentice-Hall, 1982, pgs. 75–81). The result is then forwarded, via the communication processor 8, onto the local network 9 that is connected to the system computer of the automatic insertion unit. The insertion head of the automatic unit can then be precisely adjusted relative to the printed circuit board or vice versa from the identified attitudinal position $\Delta x$, $\Delta y$.

Since a rotational error $\Delta \Phi$ can also occur in the adjustment, it is necessary to determine the position of the printed circuit board with reference to two adjustment patterns arranged at a known distance from one another. The positional error can then be calculated in $\Delta x$, $\Delta y$ and $\Delta \Phi$ by trigonometric operation from the positional deviations $\Delta x_1$, $\Delta y_1$, $\Delta x_2$, $\Delta y_2$ contained therein.

This solution presumes that the range of the interpretation window is selected of such size that the position of the adjustment pattern is always found to lie inside this measuring window in the coarse pre-positioning.

A recognition event in the above-described way can be carried out for every other adjustment pattern by reprogramming the control memory (FIG. 5) adaptively relative to the given pattern shape.

FIG. 8 shows the establishment of the windows 29 for the recognition of a circular structure 35 as the adjustment pattern.

The adjustment patterns occurring in a work process are known to the image processor of the recognition system as a knowledge base and are stored be±ore the execution of the work process.

After the apparatus is switched on, the control information for the execution of the digital image pre-processing must be loaded into the control memory 11 of the control unit 5 for a specific job before the execution of a recognition process. To that end, the vector generator of the control processor 10 is informed of the shape (for example a straight line, a circular segment, etc.) and the starting point and the end point of the processing path.

This calculates all intermediate points therefrom and deposits them in the control memory 11 as control information. The control unit 5 can therefore be programmed very quickly and with complex informational content, with little software complexity. For the following image processing, the subject to be investigated (for example, a workpiece) must be within the field of vision of the camera. After an analog-to-digital conversion, the video signal 2 proceeding from the camera is supplied to the arithmetic interpretation unit 21 of the digital image processor via the line 24.

The control information is read out of the control memory 11 of the control unit 5 synchronous with the incoming data. After passing through the parallel-to-serial converter 18, this information is used via the address multiplexer 23 as an address for the content of the result memory 22. This content is then likewise supplied to the arithmetic interpretation unit 21 and is logically operated with the incoming individual, digital video values. The result of this logical operation is in turn deposited in the result memory 22 at the same address. This operation is repeated for all picture elements, for which control information was programmed in the control memory, during the sweep of an image.

Simultaneously, the maximum value recognition 25 retains the highest control address occurring and makes this available to the address counter 27 at the end of the full video frame.

The reduced image content present in the result memory 22 after the image sweep is read out of the result memory 22 under the control of the DMA interface 26. Since the address counter 27 is set from the maximum value recognition 25, it thus indicates the highest occurring address of the result memory 22. Controlled via the DMA interface, this address is counted down during read out.

After passing through a digital amplitude conversion 28 for gray scale manipulation, the picture data are deposited in the main memory of the microprocessor system 7. The further, software-related interpretation of the reduced image data takes place in this microprocessor system, corresponding to the respective recognition job, based on a work program stored therein. Results of the recognition event, for example edge positions, circle centers, etc., are forwarded to a higher-ranking system computer (host) via the communication processor 8 and the computer network 9.

When the interpretation event is to be accelerated in the image recognition, then a plurality of modular interpretation units can be utilized in parallel. Before the recognition event, the various control memories of the plural recognition units are thereby programmed with correspondingly different regions of interpretation (such as the measuring windows 29 of FIG. 8). The results can again be supplied to the higher-ranking system computer via the common computer network 9.

On the basis of the result of this visual recognition process, the higher-ranking system computer initiates various regulation and control events in the production sequence.

It will be apparent that various modifications and/or additions may be made in the apparatus of the invention without departing from the essential feature of novelty involved, which are intended to be defined and secured by the appended claims.

What is claimed is:

1. Recognition apparatus for the programmable recognition of plural image structures comprising, in combination;
    an opto-electronic image converter for line-by-line image scanning of a frame containing an existing image structure, with a blanking internal interposed between the scanning of adjacent lines of said frame,
    an analog-to-digital converter connected to said opto-electronic image converter for producing digital values corresponding to the output of said opto-electronic image converter,
    a digital image pre-processor connected to receive an input from said analog-to-digital converter,
    a control unit for controlling operation of said pre-processor,
    said image pre-processor having a result memory, and a logic unit for logically processing the digital signals from said analog-to-digital converter with a previously determined logic result stored in said result memory, said logical processing being performed in response to control signals from said control unit, said control signals being supplied to said image pre-processor concurrently with the output of said analog-to-digital converter, with the result of said logical processing being stored as new data in said result memory,
    said control unit having a graphics processor for programing the processing during said blanking intervals, of the digital values from the analog-to-digital converter and having a control memory for storing the program of said control unit,
    an image processor connected to receive the output of said result memory, for further processing of data read out from the result memory at the end of scanning said frame,
    which said programming prescribes features which are to be recognized in said image structure, said graphics processor being connected to said image processor for receiving feedback information therefrom corresponding to a predetermined image structure.

2. Apparatus according to claim 1, wherein said logic unit logically processes the digital values from said analog-to-digital converter in response to said previously determined logic result stored in said result memory, means for storing the result of said logical processing at the same location in said result memory, and means for identifying said memory location in accordance with signals receiving from said control memory.

3. Apparatus according to claim 1, wherein said opto-electronic image converter provides a blanking interval after the line-by-line image scanning of each frame, and wherein said control unit includes a universal graphics processor having a vector generator for automatically programming said control memory within said blanking interval, which programming prescribes features which are to be recognized in said image structure, said vector generator connected to said image processor for receiving information corresponding to the edge points of a predetermined image structure.

4. Apparatus according to claim 1, wherein said result memory stores said image data in a reduced form having a total number of data items which is less than the number of pixels in a frame, after the end of scanning of a complete frame.

5. Apparatus including a plurality of recognition apparatus units in the form of modules according to claim 1, each said module defining a subset of pixels in said frame, for parallel processing of an image within said frame, and a network for supplying the outputs of said modules as inputs to a higher ranking system computer for further processing.

6. Apparatus according to claim 4, including a microprocessor connected to receive said image data from said result memory, a digital amplitude conversion unit interconnected between said result memory and said microprocessor, and a DMA interface connected to control transfer of data from said result memory to said microprocessor.

7. Apparatus according to claim 1, including a television monitor connected to receive signals from the processing path for digital image interpretation programmed in said control memory.

* * * * *